(12) United States Patent
Nagaraj et al.

(10) Patent No.: US 7,240,149 B1
(45) Date of Patent: Jul. 3, 2007

(54) MULTIPLE BRANCH OPERATIONS IN AN ASSOCIATIVE MEMORY

(75) Inventors: Ashwath Nagaraj, Los Altos, CA (US); Thomas Jeffrey Enderwick, San Jose, CA (US); Henry Kin-Chuen Kwok, Fremont, CA (US); Surya Prakash Jonnavithula, Santa Clara, CA (US); Jiing-Yang Twu, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 551 days.

(21) Appl. No.: 10/703,915

(22) Filed: Nov. 6, 2003

(51) Int. Cl.
    G06F 12/02    (2006.01)
(52) U.S. Cl. .................. 711/108; 711/202; 711/213; 365/49
(58) Field of Classification Search .............. None
    See application file for complete search history.

(56) References Cited

U.S. PATENT DOCUMENTS

| | | |
|---|---|---|
| 6,295,576 B1 | 9/2001 | Ogura et al. |
| 6,374,326 B1 | 4/2002 | Kansal et al. |
| 6,377,577 B1 | 4/2002 | Bechtolsheim et al. |
| 6,389,506 B1 | 5/2002 | Ross et al. |
| 6,389,507 B1 * | 5/2002 | Sherman ................. 711/108 |
| 6,467,019 B1 | 10/2002 | Washburn |
| 6,526,474 B1 | 2/2003 | Ross |
| 6,535,951 B1 | 3/2003 | Ross |
| 6,606,681 B1 | 8/2003 | Uzun |
| 6,643,260 B1 | 11/2003 | Kloth et al. |
| 6,651,096 B1 | 11/2003 | Gai et al. |
| 6,658,002 B1 | 12/2003 | Ross et al. |
| 6,658,458 B1 | 12/2003 | Gai et al. |
| 6,687,144 B2 | 2/2004 | Batson et al. |
| 6,715,029 B1 | 3/2004 | Trainin et al. |
| 6,717,946 B1 | 4/2004 | Hariguchi et al. |
| 6,725,326 B1 | 4/2004 | Patra et al. |
| 6,738,862 B1 | 5/2004 | Ross et al. |
| 6,775,737 B1 | 8/2004 | Warkhede et al. |
| 6,862,281 B1 | 3/2005 | Chandrasekaran |
| 6,871,262 B1 | 3/2005 | Oren et al. |
| 6,871,265 B1 | 3/2005 | Oren et al. |
| 6,961,808 B1 | 11/2005 | Oren et al. |

(Continued)

OTHER PUBLICATIONS

"Extending the LANCAM Comparand," Application Brief AB N3, Rev. 1.0a Draft, Music Semiconductors, Milpitas, CA, Sep. 30, 1998, 4 pages.

*Primary Examiner*—T Nguyen
(74) *Attorney, Agent, or Firm*—The Law Office of Kirk D. Williams

(57) ABSTRACT

Multiple branch operations using one or more associative memories are performed, which may be of particular use for, but is not limited to implementing security classification and access control lists. One embodiment generates a first lookup value including a first branch search level indication. A first lookup operation is performed on a set of associative memory entries based on the first lookup value to identify a first associative memory result, with each of associative memory entries including a branch level indication. The associative memory result is used to identify an adjunct memory result associated with a second branch level indication. A second lookup value is derived based on the second branch level indication. A second lookup operation is then performed on the associative memory entries based on the second lookup value to identify a second associative memory result.

25 Claims, 9 Drawing Sheets

U.S. PATENT DOCUMENTS

| | | |
|---|---|---|
| 6,970,971 B1 * | 11/2005 | Warkhede et al. .......... 711/108 |
| 2003/0231631 A1 | 12/2003 | Pullela |
| 2004/0030802 A1 | 2/2004 | Eatherton et al. |
| 2004/0030803 A1 | 2/2004 | Eatherton et al. |
| 2004/0100950 A1 | 5/2004 | Basu et al. |
| 2004/0170171 A1 | 9/2004 | Kanekar et al. |
| 2004/0170172 A1 | 9/2004 | Pullela et al. |
| 2004/0172346 A1 | 9/2004 | Kanekar et al. |
| 2005/0010612 A1 | 1/2005 | Enderwick et al. |
| 2005/0114602 A1 | 5/2005 | Ngai et al. |
| 2005/0157712 A1 | 7/2005 | Rangaranjan et al. |

* cited by examiner

EXEMPLARY
BRANCH
LEVEL
ENCODING
220

| BRANCH SEARCH LEVELS | BRANCH SEARCH LEVEL INDICATION 230 | BRANCH SEARCH LEVEL INDICATION 240 |
|---|---|---|
| 1-N | 0000... | 1 |
| 2-N | 1000... | 2 |
| 3-N | 1100... | 3 |
| 4-N | 1110... | 4 |
| 5-N | 1111... | 5 |
| ⋮ | ⋮ | ⋮ |

MULTIPLE BRANCH OPERATIONS IN AN ASSOCIATIVE MEMORY

TECHNICAL FIELD

One embodiment of the invention relates to communications and computer systems, especially routers, packet switching systems, and other devices; and more particularly, one embodiment relates to implementing multiple branch operations using one or more associative memories, which may be of particular use for, but is not limited to implementing security classification and access control lists.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

Packet classification as required for, inter alia, access control lists (ACLs) and forwarding decisions, is a demanding part of switch and router design. The packet classification of a received packet is increasingly becoming more difficult due to ever increasing packet rates and number of packet classifications. For example, ACLs typically require matching packets on a subset of fields of the packet header or flow label, with the semantics of a sequential search through the ACL rules.

Access control and quality of service features are typically implemented based on programming contained in one or more ACLs. A network administrator controls access to a network using access control lists (ACLs). ACLs are very flexible and allow the network administrator to specify several conditions to be met and several actions to be taken. The syntax is such that it is most easily interpreted in a serial fashion. When an ACL entry matches a packet in a process of serially evaluating an ACL in a known system, one of the actions that may be required is to skip over a certain number of subsequent ACL entries before resuming the serial evaluation. When implemented by a software program, a serial interpretation is quite natural, however, the number of packets per second that can be processed is limited.

In high performance network switches, a ternary content addressable memory (TCAM) is commonly used to increase the number of packets per second that can be processed as it allows lookup operations to be performed in parallel on numerous entries corresponding to ACL actions. However, the performance advantage of a TCAM is only available if all entries are evaluated at once and a TCAM chip can only provide the address of the first matching entry.

So, to implement features in hardware in which more than one matching condition can be specified, these multiple ACL lists are typically combined into one list using a software merge transformation which can be used for programming and associative memory. Various techniques are known for combining these items, such as Binary Decision Diagram (BDD) and Order Dependent Merge (ODM). For example, if there are two ACLs A (having entries A1 and A2) and B (having entries B1 and B2), then ODM combines these original lists to produce one of two cross-product equivalent ordered lists, each with four entries: A1B1, A1B2, A2B1, and A2B2; or A1B1, A2B1, A1B2, and A2B2. These four entries can then be programmed into an associative memory and an indication of a corresponding action to be taken placed in an adjunct memory. Lookup operations can then be performed on the associative and adjunct memories to identify a corresponding action to use for a particular packet being processed. There are also variants of ODM and BDD which may filter out the entries which are unnecessary as their values will never allow them to be matched.

However, these software merge techniques can cause each ACL entry to consume multiple entries in the TCAM. If this memory usage expansion could be avoided, a smaller, less expensive TCAM could be used or, for the same size TCAM, larger ACLs could be supported.

Similar lookup operations are required for implementing security features, such as, but not limited to the security architecture for the Internet Protocol (IPsec) defined in. S. KENT and R. ATKINSON, "Security Architecture for IP," RFC 2401, November 1998, which is hereby incorporated by reference. An IPsec (IP security) implementation operates in a host or a security gateway environment, affording protection to IP traffic. The protection offered is based on requirements defined by a Security Policy Database (SPD) established and maintained by a user or system administrator, or by an application operating within constraints established by either of the above. In general, packets are selected for one of three processing modes based on IP and transport layer header information matched against entries in the database. Each packet is either afforded IPsec security services, discarded, or allowed to bypass IPsec, based on the applicable database policies.

IPsec provides security services at the IP layer by enabling a system to select required security protocols, determine the algorithm(s) to use for the service(s), and put in place any cryptographic keys required to provide the requested services. IPsec can be used to protect one or more "paths" between a pair of hosts, between a pair of security gateways, or between a security gateway and a host. The set of security services that IPsec can provide includes access control, connectionless integrity, data origin authentication, rejection of replayed packets (a form of partial sequence integrity), confidentiality (encryption), and limited traffic flow confidentiality. Because these services are provided at the IP layer, they can be used by any higher layer protocol, e.g., TCP, UDP, ICMP, BGP, etc.

IPsec packet classification is specified as a two-layer hierarchy: the relevant security policy (SP) must be found first out of an ordered list of SPs, and then within the context of the located SP, the correct security association (SA) must be found. A security association is a simplex "connection" that affords security services to the traffic carried by it. To secure typical, bi-directional communication between two hosts or between two security gateways, two security associations (one in each direction) are required. A security association is uniquely identified by a triple consisting of a Security Parameter Index (SPI), an IP Destination Address, and a security protocol identifier. In principle, the destination address may be a unicast address, an IP broadcast address, or a multicast group address. The set of security services offered by an SA depends on the security protocol selected, the SA mode, the endpoints of the SA, and on the election of optional services within the protocol. For example, one security protocol provides data origin authentication and connectionless integrity for IP datagrams.

RFC 2401 defines a two-step process for performing lookup operations to in order to identify a SA associated with a packet, i.e., by first performing a lookup in a security policy database and then, performing a subsequent second lookup operation based on the identified security policy to identify the corresponding security association). Especially as packet rates and then number of packets to be processed by a packet processor increases, this two-stage lookup process can be limiting. Moreover, this security processing is just one operation to be performed on a packet, as additional access control list processing is also typically performed on a packet. Desired are new mechanisms for performing these lookup operations.

SUMMARY

Disclosed are, inter alia, methods, apparatus, data structures, computer-readable medium, mechanisms, and means for performing multiple branch operations using one or more associative memories, which may be of particular use for, but is not limited to implementing security classification and access control lists. One embodiment generates a first lookup value with the first lookup value including a first branch search level indication. A first lookup operation is performed on a set of associative memory entries based on the first lookup value to identify a first associative memory result, with each of associative memory entries including a branch level indication. A memory lookup operation is then performed on an adjunct memory based on the first associative memory result to identify an adjunct memory result, with the adjunct memory result being associated with a second branch level indication. A second lookup value is derived based on the second branch level indication with the second lookup value including the second branch level indication. A second lookup operation is then performed on the associative memory entries based on the second lookup value to identify a second associative memory result.

In one embodiment, the first branch indication matches the branch level indication of n entries of the associative memory entries, and the second branch indication matches the branch level indication of less than n entries of the associative memory entries. In one embodiment, the n associative memory entries includes each of said less than n entries. In one embodiment, the less than n entries includes at least two entries. In one embodiment, the first and second branch level indications each consist of a single prefix of one or more values corresponding to a logical one concatenated with a single suffix of one or more values corresponding to a logical zero. In one embodiment, the associative memory entries correspond to access control list or security operations.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 2A–2B are block diagrams illustrating branch level encodings used in one embodiment;

DETAILED DESCRIPTION

Figure 1A:
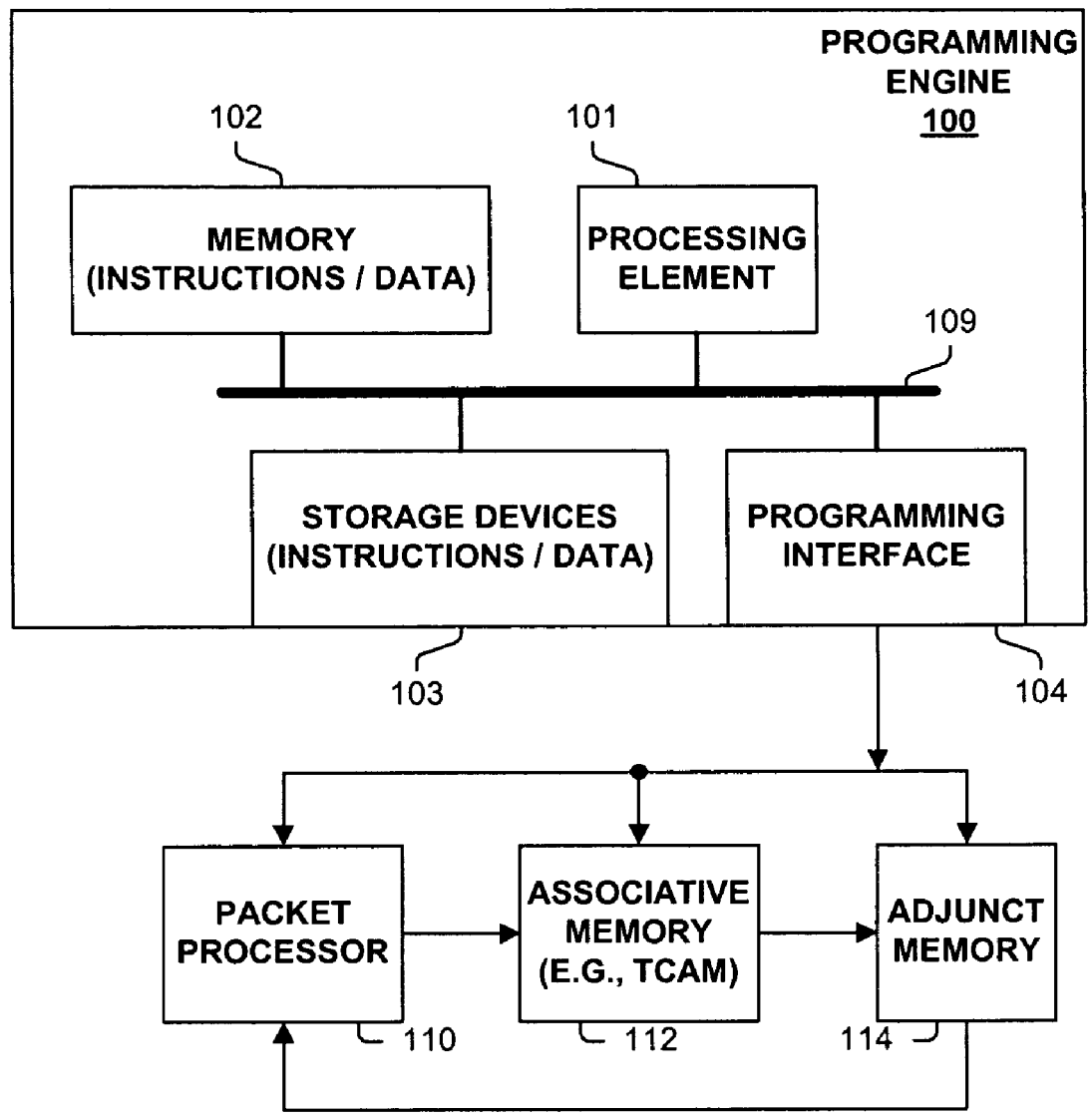
FIG. 1A is a block diagram illustrating a system used in one embodiment for programming multiple branch operations.

Disclosed are, inter alia, methods, apparatus, data structures, computer-readable medium, mechanisms, and means for performing multiple branch operations using one or more associative memories, which may be of particular use for, but is not limited to implementing security classification and access control lists in routers, packet switching systems, and other devices.

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Disclosed are, inter alia, methods, apparatus, data structures, computer-readable medium, mechanisms, and means for performing multiple branch operations using one or more associative memories, which may be of particular use for, but is not limited to implementing security classification and access control lists. One embodiment generates a first lookup value with the first lookup value including a first branch search level indication. A first lookup operation is performed on a set of associative memory entries based on the first lookup value to identify a first associative memory result, with each of associative memory entries including a branch level indication. A memory lookup operation is then performed on an adjunct memory based on the first associative memory result to identify an adjunct memory result, with the adjunct memory result being associated with a second branch level indication. A second lookup value is derived based on the second branch level indication with the second lookup value including the second branch level indication. A second lookup operation is then performed on the associative memory entries based on the second lookup value to identify a second associative memory result.

In one embodiment, the first branch indication matches the branch level indication of n entries of the associative memory entries, and the second branch indication matches the branch level indication of less than n entries of the associative memory entries. In one embodiment, the n associative memory entries includes each of said less than n entries. In one embodiment, the less than n entries includes at least two entries. In one embodiment, the first and second branch level indications each consist of a single prefix of one or more values corresponding to a logical one concatenated with a single suffix of one or more values corresponding to a logical zero. In one embodiment, the associative memory entries correspond to access control list or security operations.

FIG. 1A illustrates one embodiment of a system, which may be part of a router or other communications or computer system, for programming and using multiple branch operations. In one embodiment, programming engine 100 receives or determines sets of associative memory and adjunct memory entries including branch level indications to program associative memory 112 and adjunct memory 114. Additionally, packet processor 110 may be informed of the branch level indications, such as, but not limited to their range and/or encoding methodology. In one embodiment, programming engine 100 includes a processing element 101, memory 102, storage devices 103, a programming interface 104, which are coupled via one or more communications mechanisms 109 (shown as a bus for illustrative purposes). Although a separate associative memory 112 and an adjunct memory 114 are shown, one embodiment uses a device that combines these functions (e.g., includes the adjunct memory data in the associative memory device).

Various embodiments of programming engine 100 may include more or less elements. The operation of programming engine 100 is typically controlled by processing element 101 using memory 102 and storage devices 103 to perform one or more tasks or processes, such as, but not limited to programming and using multiple branch operations.

Memory 102 is one type of computer-readable medium, and typically comprises random access memory (RAM), read only memory (ROM), flash memory, integrated circuits, and/or other memory components. Memory 102 typically stores computer-executable instructions to be executed by processing element 101 and/or data which is manipulated by processing element 101 for implementing functionality in accordance with one embodiment of the invention. Storage devices 103 are another type of computer-readable medium, and typically comprise solid state storage media, disk drives, diskettes, networked services, tape drives, and other storage devices. Storage devices 103 typically store computer-executable instructions to be executed by processing element 101 and/or data which is manipulated by processing element 101 for implementing functionality in accordance with one embodiment of the invention.

Figure 1B:
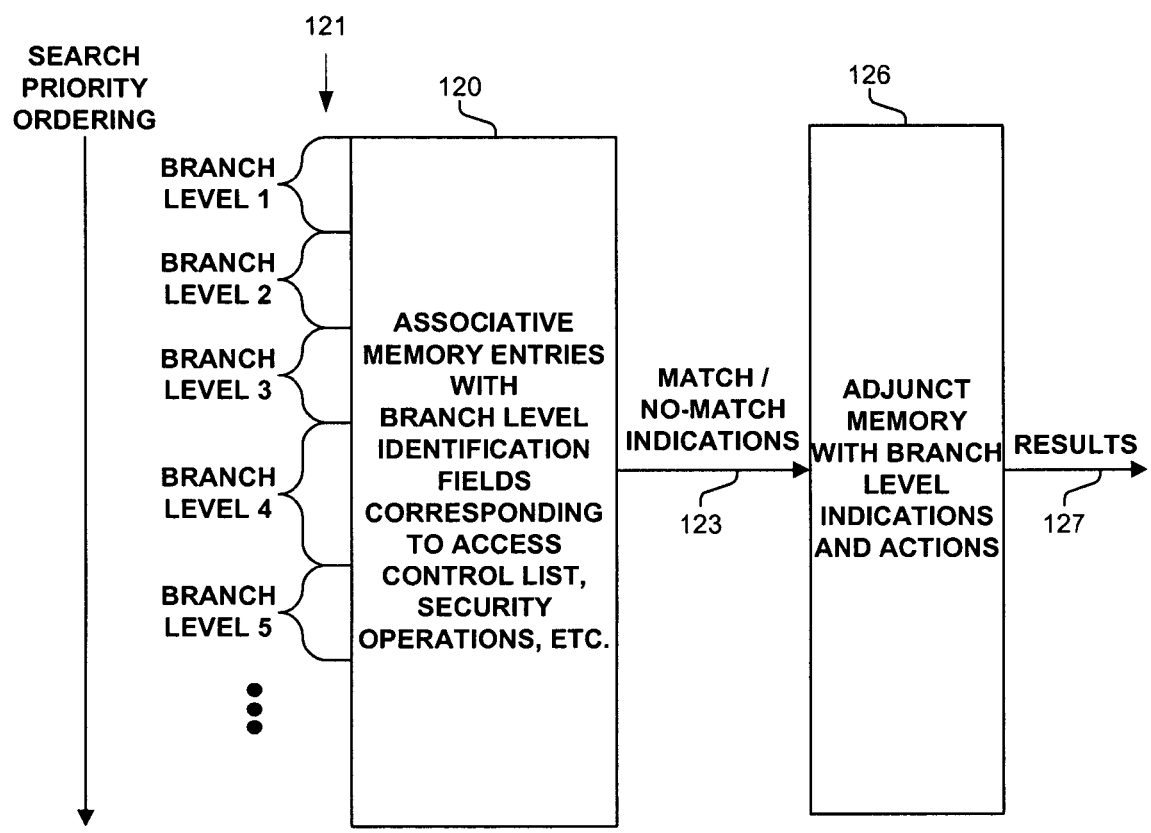
FIG. 1B is a block diagram illustrating associated memory entries with branch level identification fields used in one embodiment.

FIG. 1B is a block diagram illustrating associated memory entries 120 with branch level identification fields used in one embodiment. Illustrated are multiple branch levels 121 of associative memory entries 120, which typically include branch level identification fields. Associative memory entries 120 typically correspond to, but are not limited to access control list and security operations. Adjunct memory 126, is programmed with branch level indications and actions, with their positions in memory corresponding to the addresses of the corresponding entries in associative memory entries 120. Thus, a lookup operations in associative memory entries 120 generates match/no-match indications 123, which are used to perform memory lookup operations in adjunct memory 126 to generate results 127.

Figure 1C:
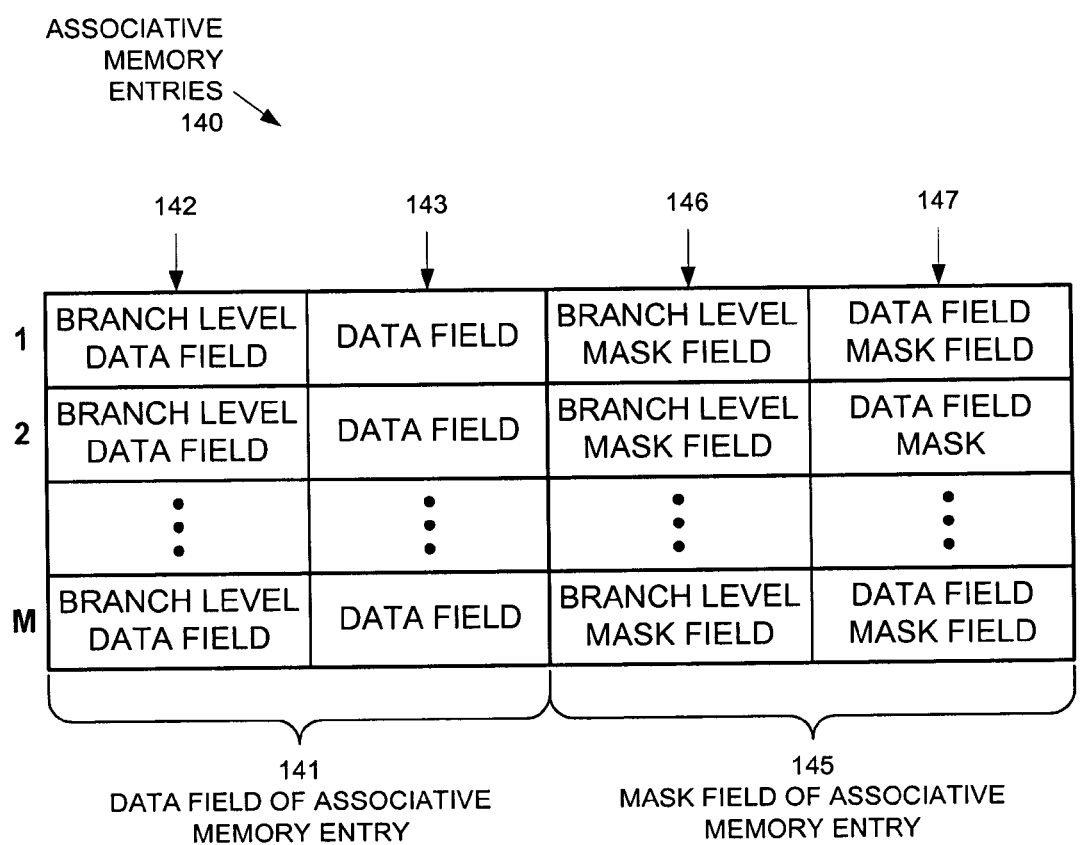
FIG. 1C is a block diagram illustrating associated memory entries with branch level identification fields used in one embodiment.

FIG. 1C is a block diagram illustrating associated memory entries with branch level identification fields used in one embodiment. Shown are M associative memory entries 140, each including a data field 141 and a mask field 145, such as in a standard ternary content addressable memory. Data field 141 includes a branch level data field 142 for indicating to which branch level the entry belongs and a data field 143 for indicating data to be matched. Mask field 145 includes a branch level mask field for masking a corresponding branch level data field 142 and a data field mask 147 for masking data field 143.

Figure 1D:
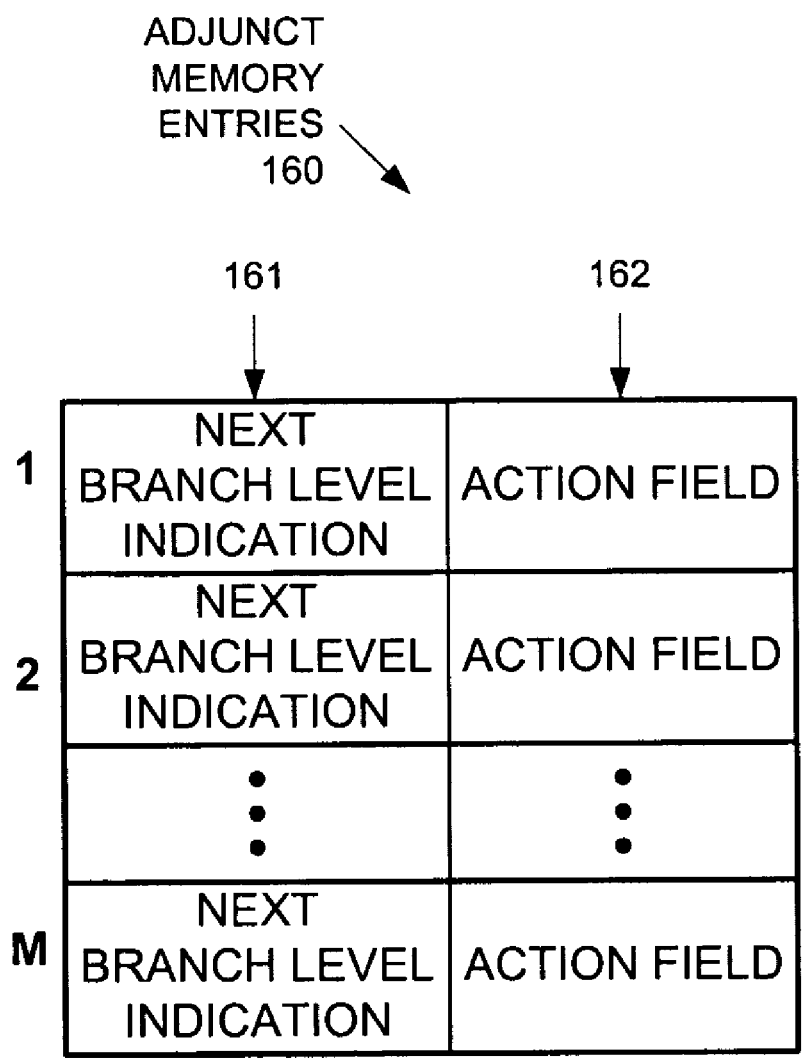
FIG. 1D is a block diagram illustrating adjunct memory entries with next branch level identifications used in one embodiment.

FIG. 1D is a block diagram illustrating adjunct memory entries 160 used in one embodiment. Each entry includes a with next branch level identification 161 for identifying a next branch level, if any, on which to perform a next lookup operation, and possibly an action field 162 for identifying an action to be taken. In one embodiment, a next branch level indication can be used directly in a lookup value; while in one embodiment, the next branch level indication is used to identify a branch search level indication to be used in a lookup operation such as that of an index into a table of branch search level indications.

Figure 1E:
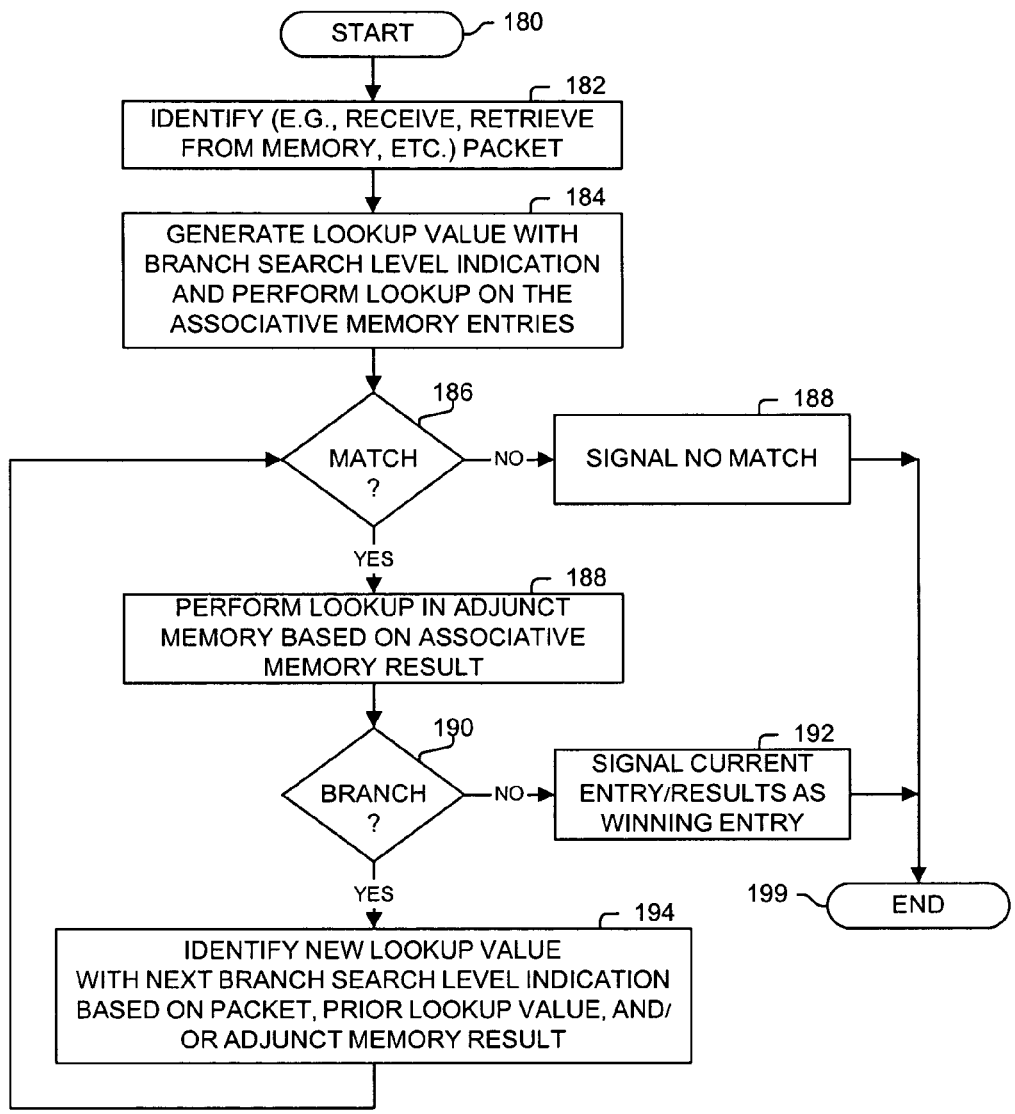
FIG. 1E is a flow diagram illustrating a lookup operation using branch search level indications used in one embodiment.

FIG. 1E is a flow diagram illustrating a lookup operation using branch search level indications used in one embodiment. Processing begins with process block 180, and proceeds to process block 182, wherein a packet is identified. Next, in process block 184, a lookup value with a branch search level indication is generated, and a lookup operation is performed on the associative memory entries. As determined in process block 186, if a matching associative memory entry is not located, then a no match signal is generated, and processing of the flow diagram is complete as indicated by process block 199. Otherwise, in process block 188, a lookup operation is performed to retrieve an adjunct memory location corresponding to the associative memory result. As determined in process block 190, if the adjunct memory result does not indicated a branch condition, then in process block 192, the adjunct memory entry is signaled as the result, and processing of the flow diagram is complete as indicated by process block 199. Otherwise, in process block 194, a new lookup value is generated with a next branch search level indication (typically either based on the adjunct memory result or another predetermined branch level such as the next branch level, etc.), and an associative memory lookup operation is performed based on the new lookup value. Processing then returns to process block 186.

Figure 2A:
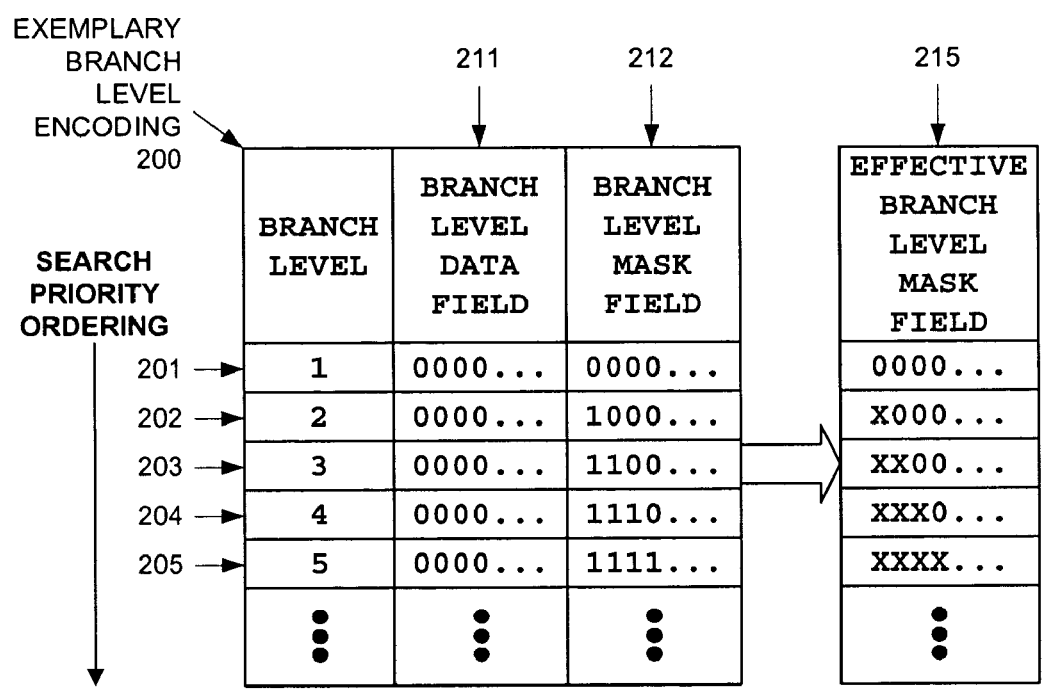

FIGS. 2A–2B are block diagrams illustrating branch level encodings used in one embodiment. Shown in FIG. 2A is an exemplary branch level encoding 200 for associative memory entries. The number of branch levels supported is unlimited, although in embodiments is typically limited by the number of bits available for encoding of a branch level. Specifically shown are five branch levels 201–205 with their branch level data field values 211 and their corresponding branch level mask field values 212. Also shown are the corresponding effective branch level matching fields 215, where an 'X' indicates to match any value (e.g., either a '0' or a '1'). For example, if four bits are used for encoding branch levels, using exemplary branch level encoding 200 methodology, branch level one would have a branch level data field of "0000" with mask "0000", branch level two would have a branch level data field of "0000" with mask "1000", branch level three would have a branch level data field of "0000" with mask "1100", branch level four would have a branch level data field of "0000" with mask "1110", and branch level five would have a branch level data field of "0000" with mask "1111". The use of these branch level values included in associative memory entries is further explained in relation to FIG. 2B.

Exemplary branch level encoding 220 illustrates two sets 230 and 240 of branch search level indications used in lookup values. These branch search level indications are typically including in an adjunct memory for easy identification of a next set of branch levels to be searched. Specifically shown are branch search level indications for five branch search levels 221–225. Using set 230 of branch search level indications, if a value of "0000" is used in a lookup value, then it will match branch levels 1–N (where N is five in the example presented in relation to FIG. 2A). A value of "1000" will match branch levels 2–N, a value of "1100" will match branch levels 3–N, a value of "1110" will match branch levels 4–N, and "1111" will match branch level 5–N. Branch search level indications 240 are included to illustrate that an adjunct memory could include values which are then encoded directly for use in a lookup value or used as an index into a table to retrieve a value for use in a lookup value.

Figure 3A:
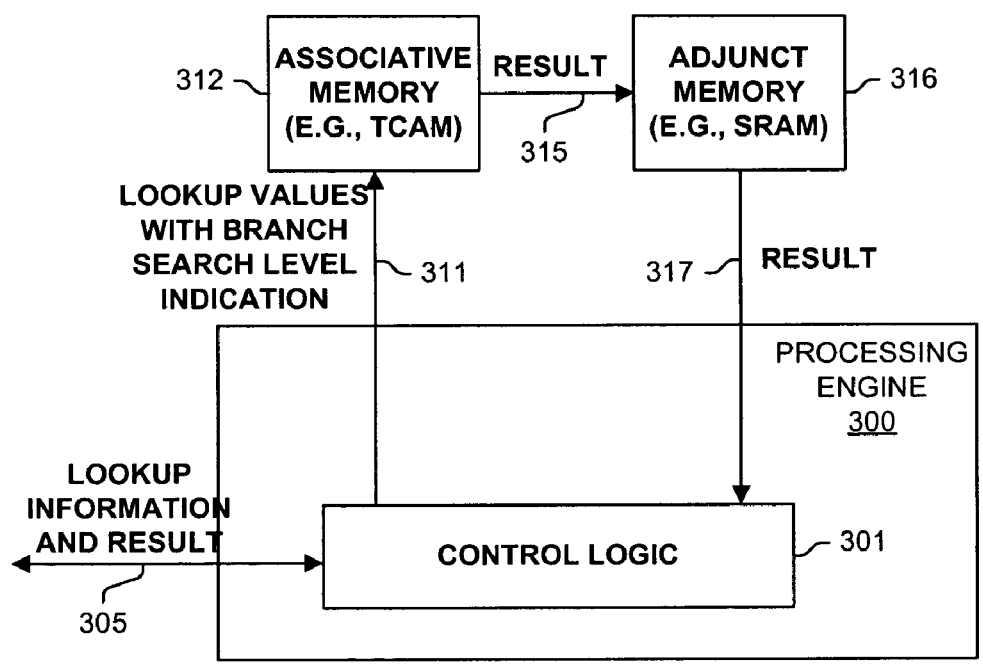
FIG. 3A is a block diagram illustrating a processing engine used in one embodiment.

FIG. 3A is a block diagram illustrating a processing engine 300 used in one embodiment. Lookup information (e.g., fields of a packet, other items, etc.) and results 305 are received and generated by control logic 301. In response, control logic 301 generates a lookup value with branch search level indication 311, which is used by associative memory 312 in performing a lookup operation to generate a result 315. If a match is identified, this values is used by adjunct memory 316 to identify result 317 which is returned to control logic 301. If a next branch level is to be searched for the corresponding item, this processes is repeated.

Figure 3B:
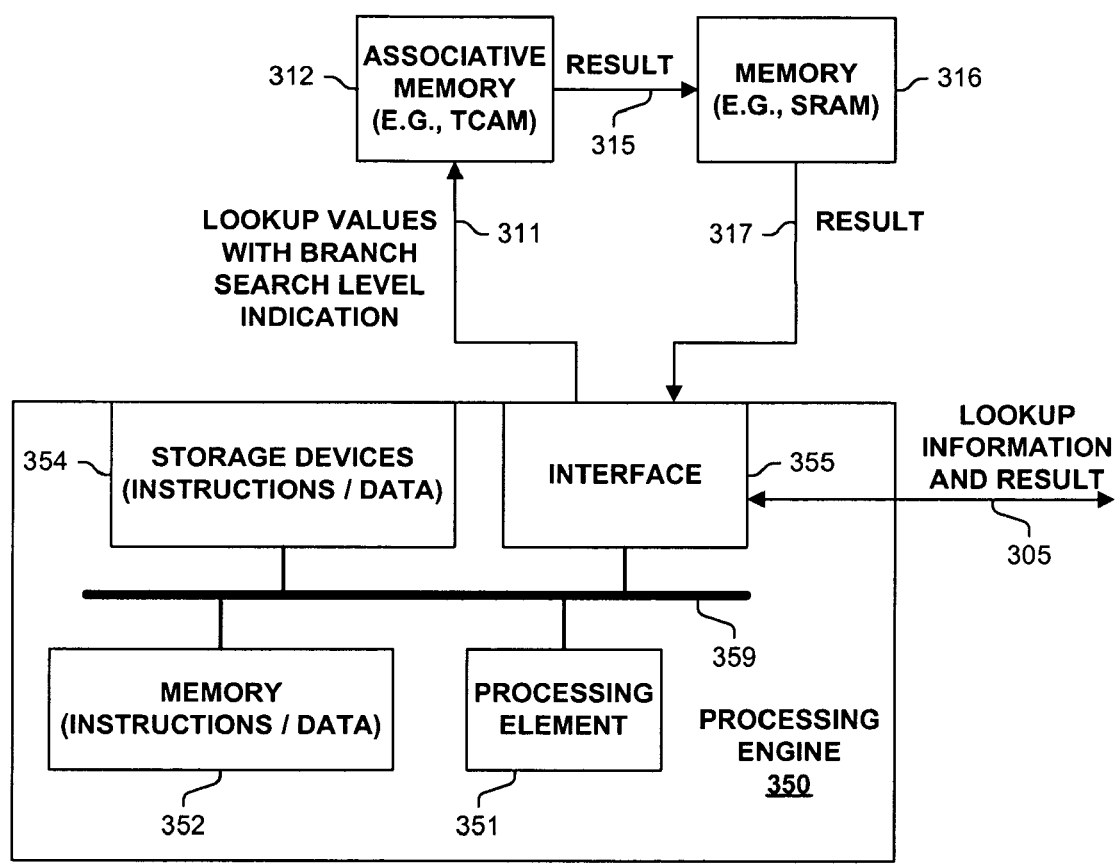
FIG. 3B is a block diagram illustrating a processing engine used in one embodiment.

FIG. 3B is a block diagram illustrating a processing engine 350 used in one embodiment (e.g., instead of processing engine 300 of FIG. 3A). As shown, processing engine 350 includes a processing element 351, memory 352, storage devices 354, an interface 355 for receiving and transmitting packets or other items and for communicating with associative memory 312 and adjunct memory 316, which are coupled via one or more communications mechanisms 359 (shown as a bus for illustrative purposes).

Various embodiments of processing engine 350 may include more or less elements. The operation of processing engine 350 is typically controlled by processing element 351 using memory 352 and storage devices 354 to perform one or more tasks or processes, such as, but not limited to programming and using multiple branch operations.

Memory 352 is one type of computer-readable medium, and typically comprises random access memory (RAM), read only memory (ROM), flash memory, integrated circuits, and/or other memory components. Memory 352 typically stores computer-executable instructions to be executed by processing element 351 and/or data which is manipulated by processing element 351 for implementing functionality in accordance with one embodiment of the invention. Storage devices 354 are another type of computer-readable medium, and typically comprise solid state storage media, disk drives, diskettes, networked services, tape drives, and other storage devices. Storage devices 354 typically store computer-executable instructions to be executed by processing element 351 and/or data which is manipulated by processing element 351 for implementing functionality in accordance with one embodiment of the invention.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method comprising:
generating a first lookup value, the first lookup value including a first branch search level indication;
performing a first lookup operation on a plurality of associative memory entries based on the first lookup value to identify a first associative memory result, each of the plurality of associative memory entries including a branch level indication;
performing a memory lookup operation on an adjunct memory based on the first associative memory result to identify an adjunct memory result, the adjunct memory result including a next branch level indication identifying a second branch level indication;
deriving a second lookup value based on the second branch level indication, the second lookup value including the second branch level indication; and
performing a second lookup operation on the plurality of associative memory entries based on the second lookup value to identify a second associative memory result.

2. The method of claim 1, wherein the first branch indication matches the branch level indication of n entries of the plurality of associative memory entries, and the second branch indication matches the branch level indication of less than n entries of the plurality of associative memory entries.

3. The method of claim 2, wherein said n entries of the plurality of associative memory entries includes each of said less than n entries of the plurality of associative memory entries.

4. The method of claim 2, wherein said less than n entries of the plurality of associative memory entries includes at least two entries.

5. The method of claim 1, wherein the first and second branch level indications each consist of a single prefix of one or more values corresponding to a logical one concatenated with a single suffix of one or more values corresponding to a logical zero.

6. The method of claim 1, wherein the plurality of associative memory entries correspond to access control list or security operations.

7. The method of claim 1, wherein the next branch level indication identifies whether or not a branch condition exits, wherein the branch condition existing means to perform another lookup operation with a next branch level indication and the branch condition not existing means not to perform such said another lookup operation.

8. A tangible computer-readable medium tangibly embodying computer-executable instructions for performing steps, said steps comprising:
   generating a first lookup value, the first lookup value including a first branch search level indication;
   initiating a first lookup operation on a plurality of associative memory entries based on the first lookup value to identify a first associative memory result, each of the plurality of associative memory entries including a branch level indication;
   initiating a memory lookup operation on an adjunct memory based on the first associative memory result to identify an adjunct memory result, the adjunct memory result including a next branch level indication identifying a second branch level indication:
   deriving a second lookup value based on the second branch level indication, the second lookup value including the second branch level indication; and
   initiating a second lookup operation on the plurality of associative memory entries based on the second lookup value to identify a second associative memory result.

9. The computer-readable medium of claim 8, wherein the first branch indication matches the branch level indication of n entries of the plurality of associative memory entries, and the second branch indication matches the branch level indication of less than n entries of the plurality of associative memory entries.

10. The computer-readable medium of claim 9, wherein said n entries of the plurality of associative memory entries includes each of said less than n entries of the plurality of associative memory entries.

11. The computer-readable medium of claim 9, wherein said less than n entries of the plurality of associative memory entries includes at least two entries.

12. The computer-readable medium of claim 8, wherein the first and second branch level indications each consist of a single prefix of one or more values corresponding to a logical one concatenated with a single suffix of one or more values corresponding to a logical zero.

13. The computer-readable medium of claim 8, wherein the plurality of associative memory entries correspond to access control list or security operations.

14. The computer-readable medium of claim 8, wherein the next branch level indication identifies whether or not a branch condition exits, wherein the branch condition existing means to perform another lookup operation with a next branch level indication and the branch condition not existing means not to perform such said another lookup operation.

15. An apparatus comprising:
   means for generating a first lookup value, the first lookup value including a first branch search level indication;
   means for performing a first lookup operation on a plurality of associative memory entries based on the first lookup value to identify a first associative memory result, each of the plurality of associative memory entries including a branch level indication;
   means for performing a memory lookup operation on an adjunct memory based on the first associative memory result to identify an adjunct memory result, the adjunct memory result including a next branch level indication identifying a second branch level indication,
   means for deriving a second lookup value based on the second branch level indication, the second lookup value including the second branch level indication; and
   means for performing a second lookup operation on the plurality of associative memory entries based on the second lookup value to identify a second associative memory result.

16. The apparatus of claim 15, wherein the first branch indication matches the branch level indication of n entries of the plurality of associative memory entries, and the second branch indication matches the branch level indication of less than n entries of the plurality of associative memory entries.

17. The apparatus of claim 16, wherein said n entries of the plurality of associative memory entries includes each of said less than n entries of the plurality of associative memory entries.

18. The apparatus of claim 16, wherein said less than n entries of the plurality of associative memory entries includes at least two entries.

19. The apparatus of claim 15, wherein the first and second branch level indications each consist of a single prefix of one or more values corresponding to a logical one concatenated with a single suffix of one or more values corresponding to a logical zero.

20. The apparatus of claim 15, wherein the plurality of associative memory entries correspond to access control list or security operations.

21. The apparatus of claim 15, wherein the next branch level indication identifies whether or not a branch condition exits, wherein the branch condition existing means to perform another lookup operation with a next branch level indication and the branch condition not existing means not to perform such said another lookup operation.

22. An apparatus comprising:
   one or more memory type components for receiving a lookup value and for generating a result, the result including a branch level indication indicating whether or not a branch condition exists, wherein the branch condition existing means to perform another lookup operation with a next branch level indication and a branch condition not existing means not to perform such said another lookup operation; and
   a processing engine configured to generate a first lookup value and provide the first lookup value to said one or more memory type components, to receive a first lookup result corresponding to the first lookup value, to generate a second lookup value based on said branch level indication of the first lookup result in response to the branch level indication indicating that a branch condition does exist, and to provide the second lookup value to said one or more memory type components.

23. The apparatus of claim 22, wherein said one or more memory type components includes an associative memory and an adjunct memory.

24. The apparatus of claim 23, wherein the associative memory includes a plurality of associative memory entries correspond to access control list or security operations.

25. The apparatus of claim 22, wherein said branch level indication consists of a single prefix of one or more values corresponding to a logical one concatenated with a single suffix of one or more values corresponding to a logical zero.

* * * * *

UNITED STATES PATENT AND TRADEMARK OFFICE
CERTIFICATE OF CORRECTION

| | |
|---|---|
| PATENT NO. | : 7,240,149 B1 |
| APPLICATION NO. | : 10/703915 |
| DATED | : July 3, 2007 |
| INVENTOR(S) | : Nagaraj et al. |

It is certified that error appears in the above-identified patent and that said Letters Patent is hereby corrected as shown below:

Col. 11, line 21, replace "indication:" with -- indication; --

Col. 12, line 2, replace "indication," with -- indication; --

Signed and Sealed this

Twenty-third Day of October, 2007

JON W. DUDAS
*Director of the United States Patent and Trademark Office*